(12) United States Patent
Wisor et al.

(10) Patent No.: US 6,430,705 B1
(45) Date of Patent: *Aug. 6, 2002

(54) METHOD FOR UTILIZING VIRTUAL HARDWARE DESCRIPTIONS TO ALLOW FOR MULTI-PROCESSOR DEBUGGING IN ENVIRONMENTS USING VARYING PROCESSOR REVISION LEVELS

(75) Inventors: Michael Wisor; Travis Wheatley; James A. Treadway, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/137,572

(22) Filed: Aug. 21, 1998

(51) Int. Cl.[7] ................................................ H02H 3/05
(52) U.S. Cl. .......................................... 714/30; 714/33
(58) Field of Search ............................. 714/30, 35, 25, 714/26, 33, 37

(56) References Cited

U.S. PATENT DOCUMENTS

| | | | | |
|---|---|---|---|---|
| 4,348,759 A | * | 9/1982 | Schnurmann | 714/724 |
| 5,337,262 A | * | 8/1994 | Luthi et al. | 702/83 |
| 5,796,751 A | * | 8/1998 | Kundu | 714/726 |
| 5,805,571 A | * | 9/1998 | Zwan et al. | 370/249 |
| 5,828,824 A | * | 10/1998 | Swoboda | 714/25 |
| 5,848,236 A | * | 12/1998 | Dearth et al. | 714/33 |
| 5,870,585 A | * | 2/1999 | Stapleton | 395/500 |
| 5,909,544 A | * | 6/1999 | Anderson, II et al. | 395/712 |
| 5,958,035 A | | 9/1999 | Carter et al. | |
| 5,991,270 A | * | 11/1999 | Zwan et al. | 370/249 |
| 6,098,094 A | * | 8/2000 | Barnhouse et al. | 709/203 |
| 6,167,363 A | * | 12/2000 | Stapleton | 703/14 |

* cited by examiner

Primary Examiner—Dieu-Minh Le

(57) ABSTRACT

A method and apparatus for concurrent testing of a plurality of microprocessors, each of which may have a different revision, by creating an abstract base class which specifies the names of a plurality of tests, creating a derived class for each revision and defining each of the tests appropriately for each of the derived classes, instantiating an object from one of the derived classes for each of the microprocessors and executing the tests by reference to the objects. A computer system is configured to be coupled to the microprocessors and, upon execution of a debug/test application on the computer system, the revision of each microprocessor is determined and an object is instantiated from the derived class corresponding to the revision. Each object is thereby dynamically bound to the tests defined for the derived class corresponding to the revision, and references to the tests via the objects automatically execute the test code specific to appropriate revision of the microprocessor.

31 Claims, 3 Drawing Sheets

METHOD FOR UTILIZING VIRTUAL HARDWARE DESCRIPTIONS TO ALLOW FOR MULTI-PROCESSOR DEBUGGING IN ENVIRONMENTS USING VARYING PROCESSOR REVISION LEVELS

CROSS-REFERENCE TO RELATED APPLICATION

This application relates to co-pending application, serial no. 09/137,570, filed on the same day as the present application and entitled "METHOD TO DYNAMICALLY CHANGE MICROPROCESSOR TEST SOFTWARE TO REFLECT DIFFERENT SILICON REVISION LEVELS" by James A. Treadway and Travis Wheatley, which is incorporated herein by reference.

BACKGROUND OF THE INVENTION

1. Field of the Invention

The invention relates generally to methods for testing device designs and more particularly to object-oriented programming methods for performing concurrent testing of multiple devices which may have differing designs and differing test requirements.

2. Description of the Relevant Art

Various problems are encountered in the development of integrated circuits (ICs), printed circuit boards and system level devices. As a result of the increasing speed and complexity, as well as the decreasing size of ICs, it is becoming more and more difficult to test and debug the design and operation of these products. (Debugging is the process of finding and eliminating problems, or bugs, in hardware or software.) When a new design is implemented, it must be debugged and tested to ensure that the device operates as expected. The complexity of debugging and testing has grown commensurately with the complexity of the devices themselves. The increased costs and time to debug and test can cause delays which disrupt manufacturing flows and hinder manufacturers' efforts to bring the products to market.

A great deal of the time required to develop and implement new microprocessor designs is spent on debugging the design. The impact of debugging on the development cycle of a new microprocessor has resulted in the development of faster and more powerful debugging tools. These tools may include features internal to the microprocessor which facilitate debugging, as well as external tools such as logic analyzers and debug/test software.

Microprocessor debug and test systems in the prior art are typically implemented using a personal computer (PC) which is interfaced with the microprocessor under test. The PC is coupled to interface hardware, which is in turn coupled to the microprocessor. Software tools are executed on the PC to provide debug/test functionality. The debug/test setup may also be configured to be used with multiple processors. A multi-processor test system uses essentially the same setup as a uniprocessor test system but, in the multi-processor system, the interface hardware is required to detect signals generated by the debug/test software and determine which of the processors is the intended recipient of each signal. Likewise, the responsive signals produced by each of the processors must be identified to the debug/test software as originating from a particular processor. The interface hardware may therefore be very complex and expensive.

Software debug/test tools may also be very complex. Many individual tests must be conducted on a microprocessor to ensure that the device performs each of its functions properly. The testing of the microprocessor is made more complicated by the fact that there are normally a number of revisions of each processor design. The various revisions may have differences which require that a particular test be performed differently on each revision. Program code which correctly performs the test on one of the revisions of the microprocessor may therefore have to be modified before it can be performed on another of the revisions of the microprocessor. The revised test may use different data, or it may involve the execution of entirely different instructions. The test system should provide the capability to test a first processor of a first revision and then test a processor of a second revision without having to entirely reconfigure the system. A debug/test application must be programmed with the appropriate data and/or test procedures for each of the revisions.

There are several approaches to the problem of testing the different revisions of a microprocessor. The simplest approach is to determine the appropriate test for each feature of a particular revision and code these tests into a debug/test application which is designed specifically for that revision. A separate application is then created for each revision. This approach has several drawbacks: it necessitates a large amount of code; the code for one revision may be duplicative of a substantial portion of the code for another revision; and modifications to a test which is identical in the code for each revision must be made separately to the applications for each of the revisions.

A similar approach entails including all of the test code for each revision in a single application and using preprocessor directives (e.g., #if and #endif) to select portions of the test code to be retained in the compiled application. While this technique would simplify the maintenance of the debug/test code by avoiding duplication of some tests and modifications to those tests, the microprocessor revision must be determined at compile time, so the application must be recompiled each time a different revision is to be tested, or separate executable applications must be maintained for each revision. This approach therefore requires large amounts of resources, either for storage or compiling.

A somewhat less cumbersome approach is to develop a single application which uses branches in the program flow to execute the particular code which is appropriate to each revision of the processor. For each test which varies between the different revisions of the microprocessor, one or more branches are added to the application, each branch containing instructions specific to one of the revisions. When a branch is encountered in the application, the appropriate fork of the branch is selected and the corresponding instructions executed. These branches may be implemented using multiple "if-then" type statements. A pseudocode example illustrating the use of "if-then" statements is shown below.

```
TEST 1:     {run test 1 (all processor revisions)}
TEST 2:     if (revision == A)
               then {run test 2 for processor revision A}
            if (revision == B)
               then {run test 2 for processor revision B}
               else { run test 2 for processor revision C}
TEST 3:     {run test 3 (all processor revisions)}
               .
               .
               .
```

The increased complexity of the code is illustrated more graphically in FIG. 1. FIG. 1 includes, on the left, a flow diagram of a series of three tests for a single revision and, on the right, a flow diagram of these same tests where one of the tests must be modified for each of three microprocessor revisions. With a single revision, each of the three tests is programmed and executed in a straightforward, sequential fashion. With the three separate test revisions, the test code becomes more complex.

The figure shows a simple series of three tests for a single-revision application as well as a corresponding application in which one of the three tests is replaced with several revision-specific tests. This is accomplished by a series of if-then-else statements which test the revision of the device under test and allow the code to branch to the appropriate revision-specific test. As the number of revisions increases, and as the number of revision-specific tests increases, it is clear that the complexity of the code will also increase.

The branches for the different versions of the test are also implemented in many cases using "switch" statements such as

```
switch      (revision)
            case (A)
                {run test for processor revision A}
            case (B)
                {run test for processor revision B}
                .
                .
                .
```

This method of coding the debug/test software can be very cumbersome. If several revisions must be provided for in a particular test within a debug/test application, the code for that test must be replaced with each of the several code variations corresponding to the several revisions. This replacement must be made for every occurrence of the test in the application. Likewise, if the application must be updated to account for a new revision of the microprocessor, the application programmer must not only write new test code, but must also locate each and every instance in the debug/test application in which one of the new tests may be executed. Each instance must then be individually updated for the new revision.

Because a microprocessor may have many hundreds of functions which must be tested, test variations necessitated by the different microprocessor revisions can cause the test application to become quite large and the complexity of the branch structure may make the application confusing and difficult to maintain. As mentioned above, the size of the application may tax the storage resources of the test system. The application will also be less efficient than a single-revision application as a result of the time which must be spent executing the control instructions that determine which branch will be taken and which test will be executed.

The size and complexity of the debug/test software is made even greater by the need to allow for concurrent testing of multiple processors. Just as the various levels of processor revisions necessitated additional branches in the application code, the concurrent testing of several processors can require additional, unwieldy program branches. The additional branches therefore compound the size and complexity problems found in single-processor debug/test applications.

SUMMARY OF THE INVENTION

These and other problems may be solved by various embodiments of an object-oriented method and system for performing tests on several microprocessors wherein the tests are specifically designed for microprocessor revisions which have different testing requirements. The method and system take advantage of software programming techniques involving pure virtual functions, abstract base classes, dynamic binding, inheritance and polymorphism and may result in reduced code size and increased maintainability.

A base class is used to enumerate various attributes of a group of devices and various operations relating to the devices. For each revision or variation of the group of devices which are to be tested, a class is derived from the base class. The derived class may be used to define the enumerated operations of one of the device revisions/variations and may also be used to define or assign values to the attributes for that revision. The derived classes corresponding to different revisions will therefore have identically named functions, but the functions themselves may be different.

In one embodiment, the base class is an abstract base class. That is, the class provides names for the member operations and attributes, but does not define them. It is left to the derived classes to provide definition to the operations (i.e., provide code) and to assign values to the attributes. In another embodiment, the base class not only names the operations and attributes, but also defines one or more of them. In this manner, the base class provides defaults for the derived classes. If one of the derived classes requires an operation or attribute which differs from that of the base class, it can be defined in the derived class. This definition will override the default supplied by the base class.

When one of the devices is tested, its revision or variation is determined and an object is instantiated from the class corresponding to the revision or variation. When a function (e.g., test) related to the device is to be performed, the function is called via a reference to the instantiated object. Likewise, when data relating to the device is needed, the data is referenced via the instantiated object. Because the only data and functions "known" to the object are those defined in the corresponding derived class, and because the derived class defines the revision-specific tests and data, the debug/test application automatically uses the revision-specific data and functions appropriate to that device.

BRIEF DESCRIPTION OF THE DRAWINGS

Other objects and advantages of the invention will become apparent upon reading the following detailed description and upon reference to the accompanying drawings in which.

Figure 1:
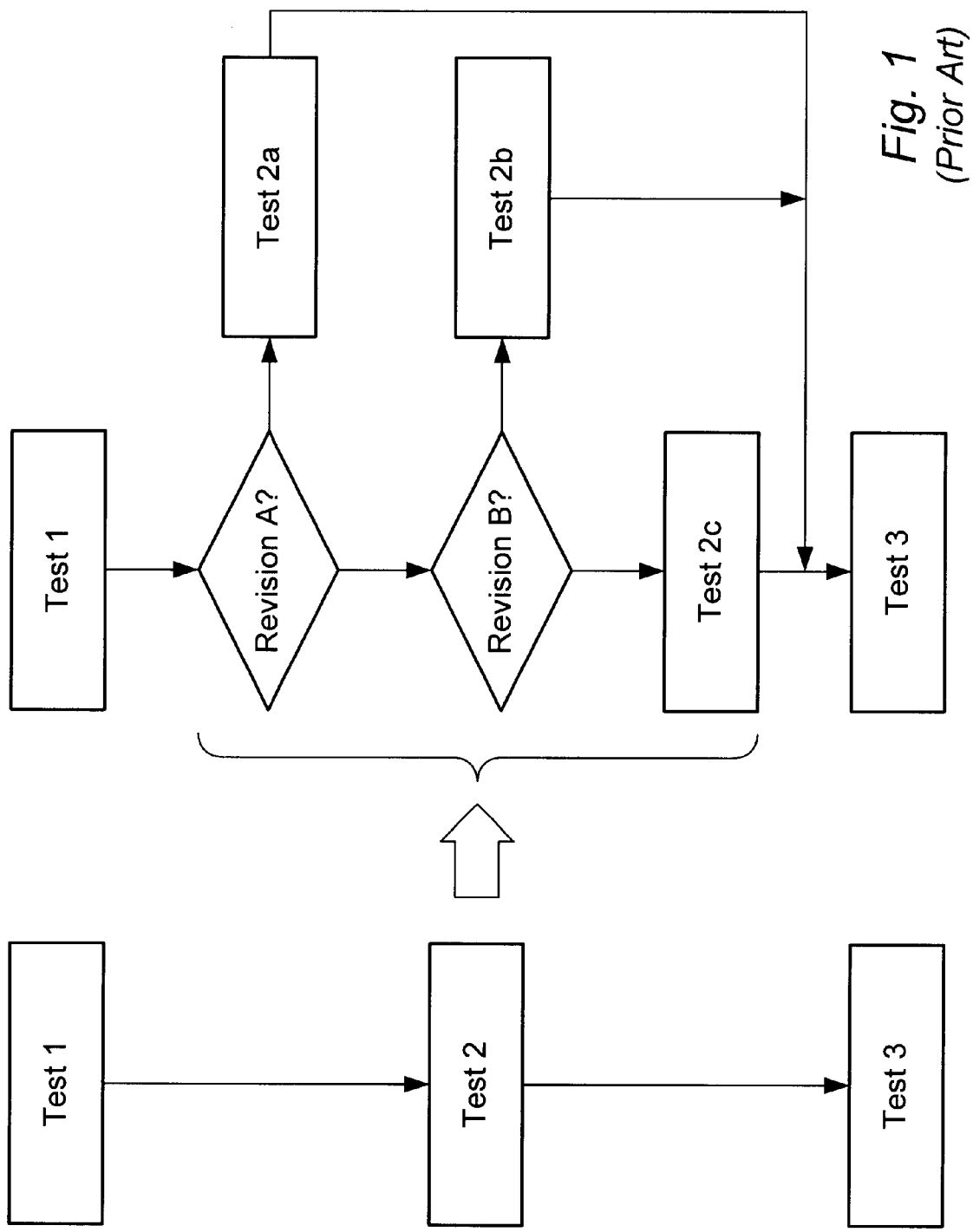
FIG. 1 is a pair of flow diagrams illustrating a series of tests for a single revision of one of the microprocessors and a series of tests to accommodate several different revisions of the microprocessors.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described in detail below. This embodiment uses object oriented programming techniques to simplify the program flow of a debug/test application and to simplify the required interface hardware. Alternate embodiments may be used to test other types of ICs, printed circuit boards or system level devices. The simplification of the program flow may result in reduced code size, improved readability and improved maintainability.

Figure 2:
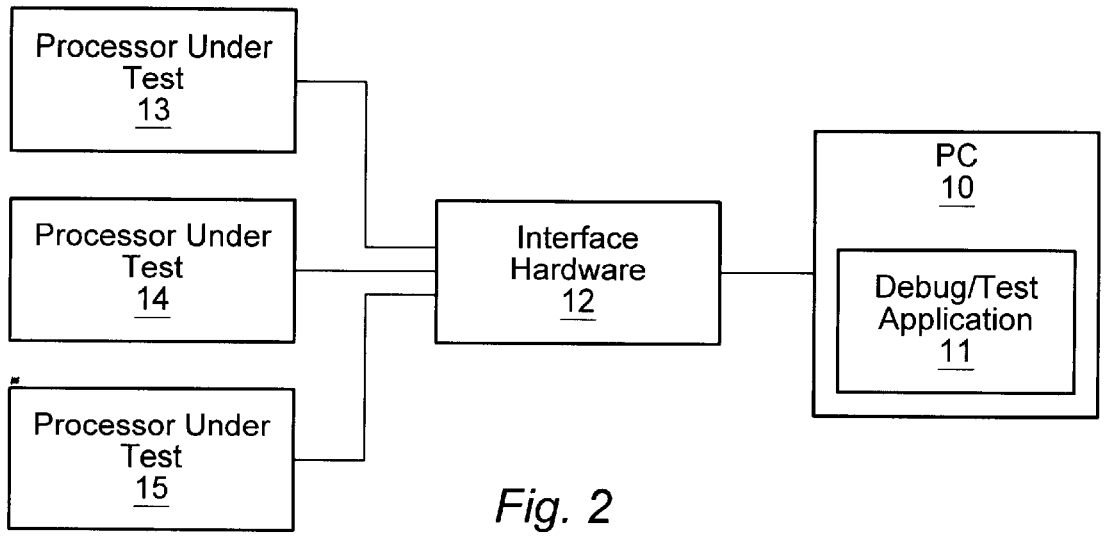
FIG. 2 is a diagram of the debug and test system hardware for multiple processors.

In one embodiment, the debug and test system uses a computer system such as a PC to execute a debug/test software application. Referring to FIG. 2, a diagram of the debug and test system is shown. The system comprises a PC 10 which is coupled to interface hardware 12, which is in turn coupled to microprocessors 13, 14, 15. In one embodiment, interface hardware 12 is a multiple-conductor cable, one end of which is configured to be connected to a parallel port of PC 10, the other end of which has several connectors configured to be connected to test ports of microprocessors 13, 14, 15. For example, a printer-type cable can be modified with connectors adapted to be connected to the test ports of the microprocessors. Debug/test application 11 is executed on PC 10 and test signals generated by the application are input to microprocessors 13, 14, 15 via interface hardware 12. The output signals generated by the microprocessors as a result of the test are returned via interface hardware 12 to PC 10 for use by debug/test application 11.

Because this configuration utilizes a parallel (printer) output port and independent lines to each of the microprocessors, the output signals to the individual microprocessors can be directed to the appropriate lines by setting data within the objects representing the respective microprocessors. Likewise, input signals received from the microprocessors can be identified by the lines which carry the signals. Interface hardware 12 therefore need not incorporate any switching logic to route the signals between microprocessors 13, 14, 15 and PC 10. In other embodiments, however, more complicated interface hardware which itself routes signals between the PC and microprocessors may be used. For instance, if each microprocessor test port requires five lines and five microprocessors are to be tested a standard parallel printer port does not there have enough lines to assign each one to an individual microprocessor, so the interface hardware must provide for sharing of the lines.

In one embodiment, the microprocessor under test is configured with a JTAG test access port. The JTAG port was designed by a group of manufacturers in the electronics industry who combined to develop a port to facilitate testing of microprocessors and other ICs. The JTAG standard was adopted by the Institute of Electrical and Electronics Engineers (IEEE) as IEEE Standard 1149.1-1990. Devices which implement this standard allow test data and instructions to be serially read into and out of the devices.

As noted above, the test code generates signals which are applied to the inputs of the microprocessors to test performance of the microprocessors functions and operations. The outputs of the microprocessors are then examined to determine whether the microprocessors function properly. The various revisions of the design may use different inputs to perform identical functions, or the functions may produce different outputs. The selection of the appropriate inputs and examination of the resulting outputs in accordance with the particular revision is achieved by using virtual functions, abstract base classes, dynamic binding, inheritance and polymorphism to automatically select the proper tests and test data for each microprocessor.

The debug/test application defines an abstract base class for the microprocessors to be tested. This base class defines various member operations and attributes. Classes for the various revisions of the microprocessor are derived from the abstract base class. The derived class for a particular revision defines the tests to be performed and the data to be used in the performance of the tests. Ordinarily, the operations and attributes of a derived class may either be explicit in the definition of the derived class or inherited from the base or intervening classes but, because the base class in this case is an abstract class, the member operations are not defined in the base class and therefore must be defined explicitly in the derived class.

When each microprocessor is tested, an object corresponding to the microprocessor revision is instantiated. That is, an object of the type of the corresponding derived class is created. The object has the attributes of the derived class and is subject to the operations of the derived class. Among these operations are the revision-specific versions of the tests to be performed on the microprocessor. When the debug/test application is executed and a particular test is encountered, the test routine is called by reference to the object and, as a result of dynamic binding, the version of the test specific to the instantiated object is executed. For example, assume that each of several classes defines a test ("Test( )") appropriately for a corresponding revision of a microprocessor. An object ("Object") is instantiated from class Revision_B. The simple C++ reference "Object.Test( )" will execute Test( ) as defined in derived class Revision_ B, from which Object was instantiated. In the case of multiple microprocessors, it may be more convenient to use an array of pointers to reference the various tests (e.g., "ObjectPointer→Test( )").

Figure 3:
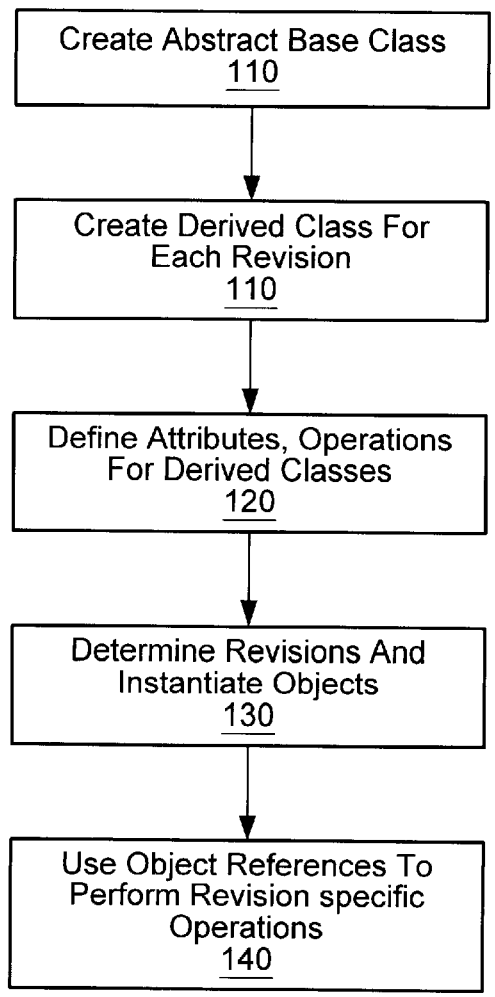
FIG. 3 is a top-level block diagram illustrating the steps for testing a microprocessor in accordance with one embodiment of the invention.

Referring to FIG. 3, a top-level block diagram illustrating the steps for testing a microprocessor in accordance with one embodiment of the invention is shown. An abstract base class is created 100, and one or more operations (tests) which may be provided for use with the microprocessor under test, as well as various attributes which the microprocessor may have, are declared. These may be referred to as the member operations and attributes of the class. The operations of the abstract base class include functions which are not defined by the abstract base class. In other words, they have names and possibly arguments, but they contain no code which defines the functions of the operations. These functions are referred to in the C++ programming language as pure virtual functions. It is left to the classes derived from the abstract base class to define these functions. (It should be noted that, in other embodiments, the base class need not be abstract, and the functions may be defined therein so that they may serve as default functions for the derived classes.)

After the abstract base class has been created, a derived class is created 110 for each revision of the microprocessor which may be tested. Each derived class inherits the attributes and operations of the abstract base class from which it is derived. Because the derived classes here inherit pure virtual (i.e., named but undefined) functions, these functions must be defined 120. Likewise, any of the attributes which are not initialized in the base class, or which vary from the initialized values of the base class must be assigned the proper values. The member operations for each derived class define the revision-specific tests which may be performed on microprocessors in that class.

An object from one of the classes can then be instantiated for each of the microprocessors under test 130. That is, objects which contain the attributes and operations of their respective classes can be created. In the debug/test application, each of the objects represents a microprocessor having the characteristics (i.e., attributes and operations) of one of the derived classes (i.e., a microprocessor of a specific revision level.). When the debug/test application executes a particular test by reference to one of the instantiated objects, the revision-specific tests defined by the derived class of the object microprocessor are executed 140.

Figure 4:
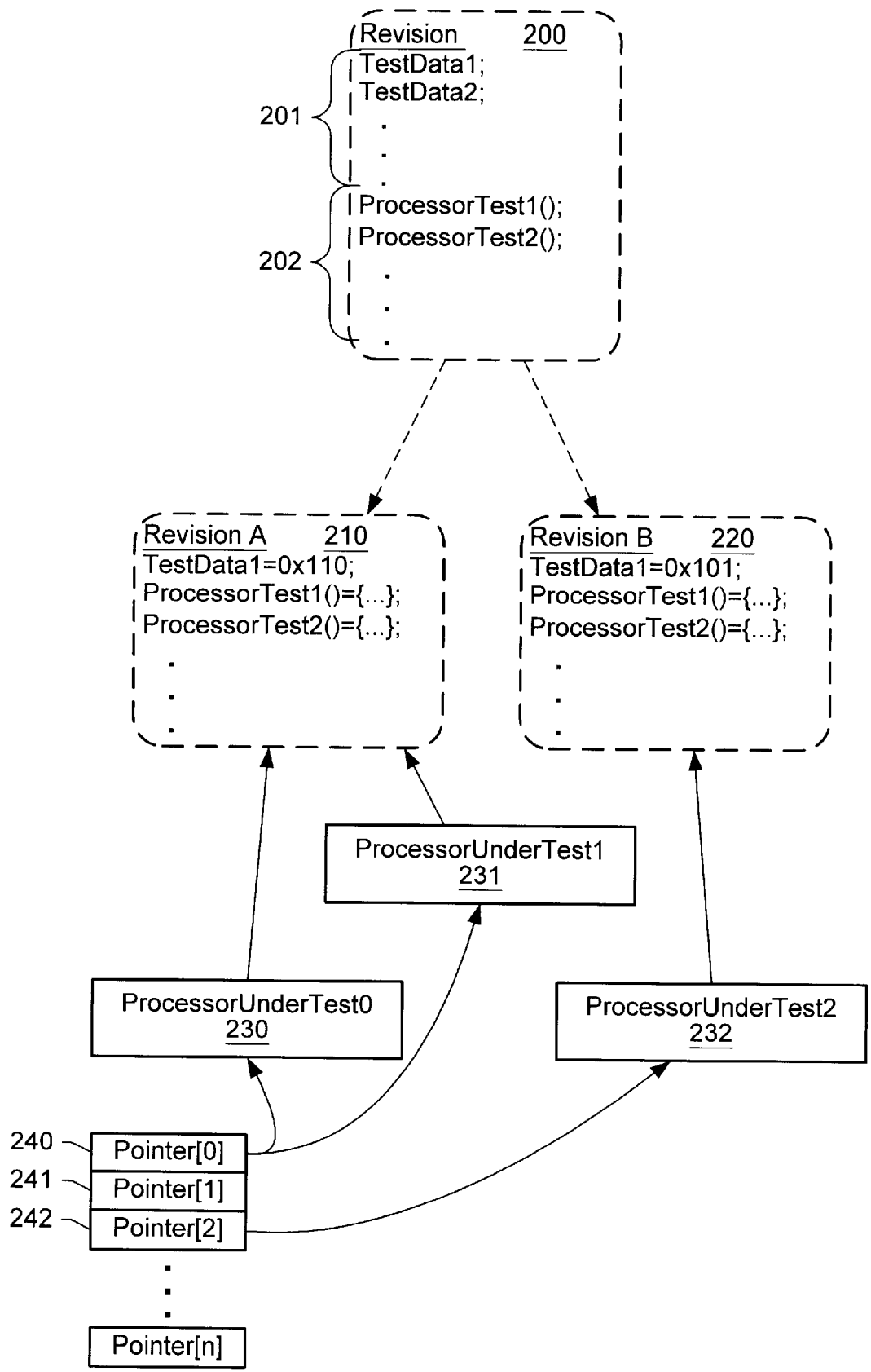
FIG. 4 is a diagram illustrating the inheritance of attributes and operations between a base class and a derived class, and the instantiation of objects from the derived classes.

Referring to FIG. 4, a diagram illustrating the hierarchy of base classes, derived classes and objects instantiated from the derived classes in one embodiment is shown. The attributes and operations of a base class are inherited by derived classes. Likewise, these attributes and operations are inherited by objects instantiated from the derived classes. Abstract base class 200 contains attributes 201 and operations 202. Operations 202 are pure virtual functions, so they are named when the class is created, but they have no actual functionality. When a derived class 210, 220 is created, the derived class inherits the attributes and operations of the base class. One or more of the attributes and operations is modified to define a specific subset of the base class. In this case, the modifications include at least the implementation of the inherited functions which, in the base class, were purely virtual. That is to say that the operations must be given some functionality to go with their names. The derived classes are thus defined in accordance with the specific characteristics of the microprocessor revisions which they will be used to test.

When objects 230, 231, 232 are instantiated from the derived classes, those objects will be handled in accordance with the attributes and operations of their respective classes. When an identified operation is called, the particular test functionality defined for the identified operation in the appropriate derived class will be performed on the referenced object. In one embodiment, an array of pointers 240, 241, 242 are used to reference the instantiated objects. A particular test can then be performed on each of the microprocessors simply by changing the index of the pointer array (e.g., "Pointer[i]→Test( ); Pointer[i+1]→Test( ); . . . ").

By implementing the abstract base class and revision-specific derived classes, defining the revision-specific tests within the derived classes and instantiating an object from one of the derived classes, the debug/test application programmer is able to simplify and streamline the application code. The programmer simply references each test via the objects. This does not change when a test varies between revisions. The programmer need not include a series of branches in the code, one of which must be selected so that the instructions specific to a particular microprocessor will be executed. The possibility of selecting the wrong branch is eliminated and the number of instructions is often reduced. Further, when one of the revision-specific tests must be modified, the modification is contained within the definitions of the classes' operations. There is no need to modify the portion of the application which references the operations, and the code is only modified in a single location, rather than every point at which the corresponding test is executed. If the application must be updated to include a new revision, the user need only add the revision-specific tests in a new derived class and update the application to allow instantiation of objects from the new derived class.

In one embodiment, the classes and objects described above are implemented in the C++ programming language. The following is an example of a C++ implementation of the creation of the classes and instantiation of the in accordance with one embodiment of the invention.

A base class Revision which describes all of the revisions of the microprocessors to be tested is implemented as follows:

```
class Revision
{
protected:
    int TestData1;
    float TestData2;
    .
    .
    .
public:
    virtual void ProcessorTest1 (void) = 0;
    virtual void ProcessorTest2 (void) = 0;
    .
    .
    .
}
```

The attributes of the class are the integer variable TestData1, floating point variable TestData2, etc. The operations are the virtual functions ProcessorTest1, ProcessorTest2, etc. In this embodiment, the attributes are protected, which means that they are accessible within the class, but not from outside the class. It is not necessary that the data be protected, but this is done as a means to safeguard the data from unwanted changes. The operations are public and can be accessed from outside the class. The Revision class leaves the implementation of the virtual functions to the classes which will be derived from it. A derived class, Revision_A, is created as follows:

```
class Revision_A: public Revision
{
public:
    Revision_A( );
    virtual void ProcessorTest1 (void);
    virtual void ProcessorTest2 (void);
    .
    .
    .
}
```

Class Revision_A is thus derived from class Revision ("Revision_A: public Revision".) Class Revision_A contains operations Revision_A( ), ProcessorTest1( ), ProcessorTest2( ), etc. Revision_A is the class constructor. It is called when an object is instantiated from class Revision_A. The class constructor may be used to initialize the object when it is instantiated. Although the attributes TestData1, TestData2, etc. do not appear in the instantiation of the object, they are contained in the object because it is derived from the base class. After the class Revision_A is created, the class constructor must be defined to perform the appropriate initialization. In this example, the constructor is used to initialize the TestData1 attribute:

```
Revision_A::Revision_A( )
{
    int TestData1 = 0x112;
}
```

Although the attributes may be conveniently initialized with the class constructor, it is not necessary to do so. Also, if desired, the constructor of a derived class may initialize an attribute to a value which is different from that used in the base class. In addition to implementing initialization in the constructor, the functionality of the formerly virtual operations must be implemented:

```
Revision_A: : ProcessorTest1(void)
{
    [first test -- code to be used specifically on microprocessors
        within the class Revision_A is inserted here]
}
Revision_A: :ProcessorTest2(void)
{
    [second test -- code to be used specifically on microprocessors
        within the class Revision_A is inserted here]
}
```

When the operations ProcessorTest1 or ProcessorTest2 are performed on a microprocessor within the Revision_A class, the test code above (which would be specified in the actual implementation) will be executed.

The steps outlined above illustrate the creation of a derived class for a single revision (revision A) of a microprocessor design. These steps are repeated for each of the revisions which may potentially be tested using the debug/test application, but using initializations and test code appropriate to each particular revision. In order to increase the readability and maintainability of the code, this embodiment groups the creation of the derived classes, then the definition of the class constructors, then the definition of the derived class attributes, then the definition of the derived class functions.

The derived classes will all contain certain attributes and/or operations which are referenced in the body of the debug/test application. In the examples above, the class Revision_A contains the attribute TestData1 and the operation ProcessorTest1( ). A class Revision_B would also contain attributes and operations having these names, although the corresponding values and code might be different. These attributes and operations are referenced by setting a pointer to the derived class corresponding to the revision under test and then referencing the test code or data using the common name and the pointer. For example, if the microprocessor under test is a revision B, the pointer ProcessorUnderTest is set to point to an object instantiated from class Revision_B. Then, the attributes and operations of the microprocessor under test can be referenced via the name of the pointer and the name of the attribute/operation, neither of which changes in the application code. The attributes and operations appropriate to the revision of the microprocessor under test are automatically selected because the pointer points to an object of the appropriate derived class. Alternatively, the object itself may be used to reference the member attributes and operations instead of using a pointer to do so.

When a derived class is set up for each potential revision of the microprocessor (i.e., the attributes and operations of each of the derived classes is defined,) the debug/test application code can use a simple if-then-else or switch statement to set the pointer. The remainder of the code can be written with simple references to the attributes and operations of the derived classes:

```
void main(void)
{
    int revision;
    revision = GetRevision( );
    if(revision == A)
        Processor = new Revision_A;
    else if (revision == B)
        Processor = new Revision_B;
    .
    .
    .
    Processor->ProcessorTest1( );
    .
    .
    .
    Processor->ProcessorTest2( );
    .
    .
    .
}
```

If the microprocessor is under revision A, the tests specific to revision A are performed. If the microprocessor is under revision B, the tests specific to revision B are performed. The debug/test application thereby adapts itself to perform each test using code which is appropriate for the microprocessor under test. If it is necessary to modify the code of the debug/test application to incorporate additional revisions, the programmer need only create a new class as described above and modify the if-then-else or switch statement which sets the object pointer so that it includes the new derived class. There is no need to modify every occurrence of each value and each function in the application which varies from revision to revision. Likewise, if it is necessary to modify any of the test code, the modifications are made only where the corresponding function is defined.

Each of the microprocessors is handled in this manner. In order to concurrently test multiple microprocessors, an array of pointers is used instead of a single object pointer. One element of the array is set for each of the microprocessors under test. Then, when a test is to be performed on one of the microprocessors, the appropriate pointer is selected simply by choosing the array index corresponding to that microprocessor. The name of the test function remains the same for each of the microprocessors, as does the name of the object pointer array. Because each element can point to an object of a different revision class, the different microprocessors can be tested according to the specifics of their respective revisions without making the application code more complex.

The array of pointers to the objects representing the microprocessors can be set up as follows:

for (I=0; I<number_of_processors; I++)

```
{
    revision = GetRevision( );
    if(revision == A)
        Processor[I] = new Revision_A;
    else if (revision == B)
        Processor[I] = new Revision_B;
}
```

Then, in the body of the debug/test application, a test for an $I^{th}$ microprocessor can be easily called:

Processor[I]→ProcessorTest1( ),

In one embodiment, the functions identified with a particular microprocessor under test may include code to control the routing of the associated test signals. The test signals can therefore be dispatched to a corresponding set of data lines at the output port of the PC. These data lines interface exclusively with the corresponding microprocessor and require no switching hardware to direct test signals to the microprocessor. This configuration can be achieved, for example, using the printer port as the output port. A printer cable provides several sets of parallel data lines from the port, each of which could be routed to a different microprocessor. Because this routing function can thus be moved from the interface hardware to the test code, the multiple-processor interface hardware used in conjunction with the debug/test application can be more simple and less expensive than that of the prior art.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method implemented in a hardware test system for testing a plurality of microprocessors having one or more of a plurality of silicon revisions, the method comprising:

defining a base test class having one or more member test operations;

defining a plurality of derived classes, said derived classes inheriting said one or more member test operations from the base class, each of said derived classes corresponding to one of said plurality of silicon revisions and including particular instructions corresponding to a microprocessor of said corresponding silicon revision, wherein said particular instructions control the routing of test signals to said corresponding microprocessor;

for each of said plurality of microprocessors, instantiating an object from a corresponding one of said plurality of derived classes;

for each of said plurality of microprocessors, executing said one or more member test operations of said corresponding object, wherein said executing generates a plurality of said test signals; and inputting said test signals to each of said plurality of processors.

2. The method of claim 1, further comprising: for each of said plurality of microprocessors, determining which one of said plurality of silicon revisions corresponds to each of said plurality of microprocessors, wherein said corresponding object is instantiated from said one of said derived classes corresponding to said one of said plurality of microprocessor revisions.

3. The method of claim 2 wherein said member operations of said base class are virtual functions and wherein said method further comprises assigning code giving said member operations functionality to said member operations in one or more of said derived classes.

4. The method of claim 3 wherein said executing said one or more member operations of said corresponding derived class comprises executing said code assigned to said one or more member operations.

5. The method of claim 4 wherein said executing said one or more member operations further comprises generating test signals and conveying said test signals to a corresponding one of said plurality of microprocessors.

6. The method of claim 5 further comprising receiving output signals from said corresponding one of said plurality of microprocessors and analyzing said output signals.

7. The method of claim 3 wherein said base class has one or more member attributes and wherein said method further comprises assigning values to said member attributes.

8. The method of claim 4, further comprising defining an array of object pointers and, for each of said objects corresponding to said plurality of microprocessors, setting one of said object pointers to point to said object.

9. The method of claim 8 wherein said executing said one or more member operations comprises referencing said member operations of said object indicated by said pointer.

10. The method as recited in claim 1, wherein a first silicon revision of said plurality of microprocessors uses a firs t input to perform a first function, and wherein a second silicon revision of said plurality of microprocessors uses a second input to perform said first function, wherein said first input is different from said second input.

11. The method as recited in claim 1, wherein a first silicon revision of said plurality of microprocessors produces a first output in response to performing a first function, and wherein a second silicon revision of said plurality of microprocessors produces a second output in response to performing said first function, and wherein said first output is different from said second output.

12. The method as recited in claim 1, wherein said member operations of said base class are defined within said base class.

13. The method as recited in claim 12, wherein a first derived class explicitly defines a first one of said member operations of said base class, and wherein the first member operation is defined differently in said first derived class than in said base class.

14. The method as recited in claim 1 further comprising adding a new derived class, said new derived class derived from said base class corresponding to a new silicon revision of said plurality of microprocessors.

15. The method as recited in claim 1, wherein said instantiating comprises calling a class constructor of said one of said derived classes.

16. The method as recited in claim 15, wherein said calling comprises calling said class constructor and specifying one or more values for one or more attributes of said one of said derived classes.

17. A system for testing a plurality of microprocessors having potentially different revisions comprising:

a computer system configured to execute a test application, said test application being configured to:

define a plurality of classes, each class corresponding to one of said plurality of silicon revisions of said microprocessor and having one or more member test operations and including particular instructions corresponding to a microprocessor of said corresponding silicon revision, wherein said instructions control the routing of test signals to said corresponding microprocessor, instantiate a plurality of objects, each said object being instantiated from one of said classes, and execute said one or more member test operations of said objects to produce a plurality of said test signals; and an interface configured to be coupled between said computer system and said plurality of microprocessors, said interface being configured to convey said test signals between said computer system and said plurality of microprocessors.

18. The system of claim 17 wherein said test application is configured to define a base class and wherein said plurality of classes corresponding to said plurality of revisions of said integrated circuit are derived from said base class.

19. The system of claim 18 wherein said test application is further configured to define said one or more member operations.

20. The system of claim 17 wherein said interface is configured to be coupled to a JTAG port on said integrated circuit and wherein said interface is configured to convey said test signals to said JTAG port.

21. The system of claim 20 wherein each of said test signals is associated with one of said plurality of integrated circuits and wherein said test application is configured to route each of said test signals to said associated integrated circuit.

22. The system of claim 21 wherein said interface comprises a plurality of sets of electrical lines, each set coupling one of said integrated circuits to said computer system, and wherein said test application is configured to route said test signals to said associated integrated circuit by conveying said test signals on one of said sets of electrical lines associated with said integrated circuit.

23. The system of claim 20 wherein said interface is configured to be coupled to a parallel port on said computer system.

24. The system of claim 23 wherein said parallel port comprises a printer port.

25. A method for testing a plurality of microprocessors having one or more silicon revisions, the method comprising:
  coupling said plurality of microprocessors to a computer system;
  generating a plurality of test signals at said computer system, wherein said generating comprises:
    defining a base test class having one or more member test operations and including instructions corresponding to a microprocessor of said corresponding silicon revision, wherein said instructions control the routing of said test signals to said corresponding microprocessor,
    determining a silicon revision of each of said plurality of microprocessors,
    instantiating an object from one of said classes for each of said plurality of microprocessors, each said one of said classes corresponding to said silicon revision of each of said plurality of microprocessors, said objecting having said member test operations of said corresponding class,
  executing said one or more member operations of said objects to produce said test signals;
  inputting said test signals to said microprocessor;
  generating a plurality of output signals at said microprocessor;
  receiving said output signals at said computer system; and
  analyzing said output signals.

26. The method of claim 25 wherein said generating a plurality of test signals further comprises defining a plurality of pointers, each said pointer pointing to one of said objects.

27. The method of claim 26 wherein said executing said one or more member operations of said objects is achieved by referencing said member operations corresponding to said objects.

28. A computer readable medium configured to store instructions that, when executed by a processor are configured to:
  define a base class corresponding to a plurality of microprocessors, said plurality of microprocessors having one or more silicon revisions;
  define one or more derived classes, wherein each of the derived classes corresponds to the silicon revisions of the plurality of microprocessors and is derived from the base class, and each further including instructions corresponding to a microprocessor of said corresponding silicon revision, wherein said instructions control the routing of test signals to said corresponding microprocessor;
  instantiate objects from a first derived class, wherein the first derived class corresponds to the silicon revision of one of said plurality of microprocessors;
  execute one or more member test functions of the first derived class by reference to the objects;
  generate a plurality of test signals to be conveyed to each of said plurality of microprocessors; and
  receive input signals conveyed from said plurality of microprocessors.

29. A system for testing a plurality of integrated circuits, the integrated circuits having potentially different revisions, the system comprising:
  a computer system configured to execute a test application, the test application being configured to:
    define a plurality of classes, wherein each class corresponds to one of the different revisions of the integrated circuit, and wherein each class has one or more member operations;
    instantiate a plurality of objects, wherein each of the plurality of objects is instantiated from one of the classes;
    execute the one or more member operations of the objects to produce a plurality of test signals; and
    drive the test signals to each of the plurality of the integrated circuits, wherein each of the integrated circuits includes a serial test interface to which the test signals are driven from the computer system.

30. The system as recited in claim 29, wherein the serial test interface is a boundary scan interface.

31. The system as recited in claim 30, wherein the boundary scan interface is a JTAG interface.

* * * * *

UNITED STATES PATENT AND TRADEMARK OFFICE
CERTIFICATE OF CORRECTION

PATENT NO. : 6,430,705 B1
DATED : August 6, 2002
INVENTOR(S) : Michael Wisor, Travis Wheatley and James A. Treadway It is certified that error appears in the above-identified patent and that said Letters Patent is hereby corrected as shown below:

Column 12,
Line 18, please change "firs t" to -- first --.

Signed and Sealed this

Eleventh Day of February, 2003

JAMES E. ROGAN
*Director of the United States Patent and Trademark Office*